United States Patent
Asano

(10) Patent No.: US 6,775,097 B2
(45) Date of Patent: *Aug. 10, 2004

(54) ROTATIONAL DRIVING APPARATUS FOR DISK AND MANUFACTURING METHOD THEREFOR

(75) Inventor: Isao Asano, Fukushima-ken (JP)

(73) Assignees: Alps Electric Co., Ltd., Tokyo (JP); Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,091

(22) Filed: Mar. 8, 1999

(65) Prior Publication Data

US 2002/0030925 A1 Mar. 14, 2002

(30) Foreign Application Priority Data

Mar. 9, 1998 (JP) .......................................... 10-056675

(51) Int. Cl.[7] .............................................. G11B 19/20
(52) U.S. Cl. ............................... 360/99.08; 360/99.04; 369/263
(58) Field of Search .................. 360/99.04, 99.08, 360/99.05, 98.07; 310/51, 153; 369/270, 271, 258, 261, 263; 74/572–574

(56) References Cited

U.S. PATENT DOCUMENTS

| | | | | |
|---|---|---|---|---|
| 4,466,032 A | * | 8/1984 | Saito | 360/99.05 |
| 4,742,419 A | * | 5/1988 | Kato | 360/133 |
| 4,823,218 A | * | 4/1989 | Ibe et al. | 360/104 |
| 4,896,232 A | * | 1/1990 | Sugawara | 360/99.04 |
| 4,933,583 A | * | 6/1990 | Ripplinger | 310/156 |
| 5,016,131 A | * | 5/1991 | Riggle et al. | 360/106 |
| 5,103,358 A | * | 4/1992 | Munekata | 360/99.04 |
| 5,130,870 A | * | 7/1992 | Jabbari | 360/99.08 |
| 5,240,358 A | * | 8/1993 | Hackett et al. | 409/141 |
| 5,319,270 A | * | 6/1994 | Tanaka et al. | 310/67 R |
| 5,367,909 A | * | 11/1994 | Heilman et al. | 73/468 |
| 5,476,369 A | * | 12/1995 | Fowlkes et al. | 417/410.5 |
| 5,625,515 A | * | 4/1997 | Brown | 360/106 |
| 5,635,778 A | * | 6/1997 | Fujita et al. | 310/51 |
| 5,798,887 A | * | 8/1998 | Yoshida et al. | 360/99.08 |
| 5,892,306 A | * | 4/1999 | Lloyd | 310/51 |
| 5,907,458 A | * | 5/1999 | Choi | 360/107 |
| 5,995,327 A | * | 11/1999 | Hanada et al. | 360/104 |
| 6,005,311 A | * | 12/1999 | Matsushima | |
| 6,005,749 A | * | 12/1999 | Ikuta et al. | 360/99.12 |
| 6,125,098 A | * | 9/2000 | Osawa | 369/266 |
| 6,198,715 B1 | * | 3/2001 | Kouno et al. | 369/263 |
| 6,205,110 B1 | * | 3/2001 | Miyamoto et al. | 369/266 |
| 6,219,328 B1 | * | 4/2001 | Kume et al. | 369/269 |
| 6,507,555 B1 | * | 1/2003 | Masaki et al. | 369/263 |

FOREIGN PATENT DOCUMENTS

JP           3-29832           6/1991

* cited by examiner

*Primary Examiner*—Brian E. Miller
(74) *Attorney, Agent, or Firm*—Brinks Hofer Gilson & Lione

(57) ABSTRACT

The rotational balance by weight of a rotational driving apparatus for a disk is adjusted in a state in which a hub or a dummy member equivalent to the hub is fixed onto a turntable while a motor thereof is driven. When the hub is mounted on the turntable, rotation with excellent weight balance can be achieved, resulting in prevention of vibration due to imbalance of weight.

6 Claims, 3 Drawing Sheets

ROTATIONAL DRIVING APPARATUS FOR DISK AND MANUFACTURING METHOD THEREFOR

BACKGROUND OF THE INVENTION

1. Field of the Invention

The present invention relates to a rotational driving apparatus and to a manufacturing method therefor, for a disk recording medium, such as a floppy disk, in which a hub thereof is placed on a turntable and is centered.

2. Description of the Related Art

In a floppy disk, a metal hub is perforated with a center hole and a driving hole is disposed in the center of the disk as a flexible magnetic recording medium.

In a rotational driving apparatus for rotating the disk, a turntable is formed which includes a magnet for magnetically attracting the disk, a center axis projecting from a supporting surface of the turntable, and a driving pin projectably disposed from the supporting surface of the turntable supported by a plate spring or a swing arm.

When the disk is mounted, the center hole of the hub is inserted by the center axis of the turntable, and just after the turntable is started, the driving pin is inserted into the driving hole. Afterward, centering will take place to position the hub with respect to the turntable. In the centering, when the turntable is rotated, the center axis and the driving pin urge inner edges of the center hole and the driving hole of the hub, respectively, in directions opposing each other. At this time, the hub slides slightly on the supporting surface of the turntable.

In the state in which the hub is positioned on the turntable and is centered, as described above, the turntable, the hub, and also the combined disk and hub are rotated by a driving force of a motor driving unit applied to the turntable.

However, a rotor of the motor driving unit is not necessarily balanced by weight with regard to the rotational center, and the turntable is also imbalanced by weight with regard to the rotational center because the turntable has the driving pin and the supporting member. Therefore, nonuniform rotation is prone to be generated by the motor driving unit due to the imbalance of the rotating members including the turntable.

Conventionally, balance adjustment of the rotating members is performed when the motor driving unit is assembled or when the motor driving unit is assembled with the turntable and the driving pin.

However, a rotated member mounted on the turntable is not necessarily balanced with respect to weight. For example, the hub disposed in the center of the disk is perforated with a center hole so as to be inserted by the center axis of the turntable and the driving hole to be inserted by a driving pin. Both holes make the hub imbalanced with respect to weight around the center of the hub.

Accordingly, even if balance adjustment of the rotating members, including the motor driving unit or the turntable, is performed, as described above, the entire rotating portion will be weight imbalanced when a rotated member is mounted.

In a driving apparatus at a low rotational speed of approximately between 300 to 360 rpm, such as in conventional floppy disk driving apparatuses, the imbalance has little actual adverse effect on the rotation of the disk when only the balance adjustment of the motor driving unit or the turntable is performed.

In contrast, the driving apparatus for a high-bit-density floppy disk is very rapidly driven at a turntable rotation of several thousand rpm (for example, at 3600 rpm). Therefore, the imbalance provided by a rotated member mounted on the turntable has an effect on the rotation, such as vibration of the rotating portion, when the disk is driven, causing a probable adverse effect on servo movement of the motor.

SUMMARY OF THE INVENTION

Accordingly, to solve the above-mentioned problems in the conventional art, it is an object of the present invention to provide a rotational driving apparatus for a disk and a manufacturing method therefor (adjustment method) which prevent the rotation from vibrating and the like even if a rotated member mounted on the turntable is imbalanced.

A rotational driving apparatus for a disk according to the present invention comprises a turntable for magnetically attracting a hub disposed in the center of the disk, a center axis protruding at the rotational center of the turntable, a driving pin supported by the turntable so as to be projectable therefrom, and motor driving means for rotationally driving rotating members including the turntable, wherein rotational balance adjustment of the rotating members has been achieved by fixing, to the turntable, the hub having a center hole to be inserted thereinto by the center axis and a driving hole to be inserted thereinto by the driving pin, the hub attached to the disk, or a dummy member having the same distribution of weight as that of the hub.

A method for manufacturing (method for adjusting) a rotational driving apparatus for a disk according to the present invention comprises the steps of assembling a turntable for magnetically attracting a hub disposed in the center of the disk, a center axis protruding at the rotational center of the turntable, a driving pin supported by the turntable so as to be projectable therefrom, and motor driving means for rotationally driving rotating members including the turntable; and adjusting rotational balance of the rotating members by fixing, to the turntable, the hub having a center hole to be inserted thereinto by the center axis and a driving hole to be inserted thereinto by the driving pin, the hub attached to the disk, or a dummy member having the same distribution of weight as that of the hub.

In accordance with the present invention, in the state in which at least the hub or a dummy member having the same distribution of weight as that of the hub is fixed onto the turntable while the motor driving means and the turntable are assembled, the rotational weight balance of the entire rotating member is adjusted by partially adding or partially removing weight from the rotating members. Therefore, if the turntable is rotated in a state such that a rotated member formed of the disk and the hub is mounted thereon, the rotational balance cannot be disturbed. Furthermore, if the turntable is rotated at several thousand rpm, the vibration will not be generated.

DESCRIPTION OF THE PREFERRED EMBODIMENTS

Figure 1:
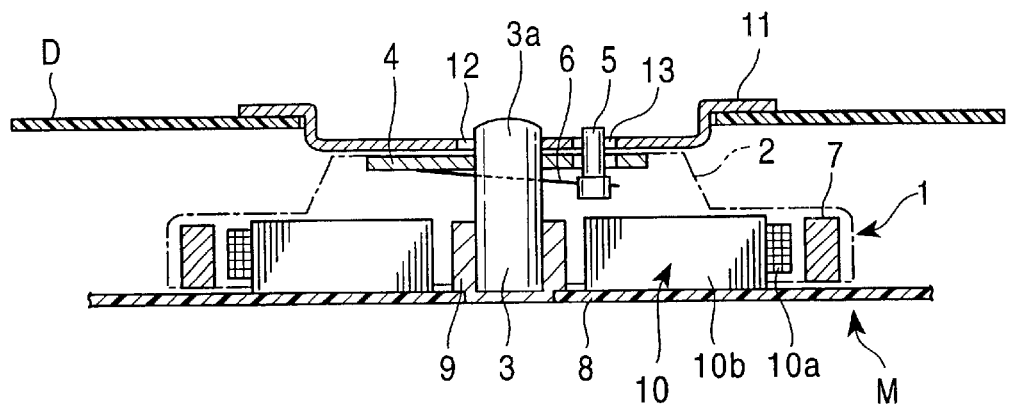
FIG. 1 is a cross-sectional view showing a rotational driving apparatus for a disk according to the present invention.
Figure 2:
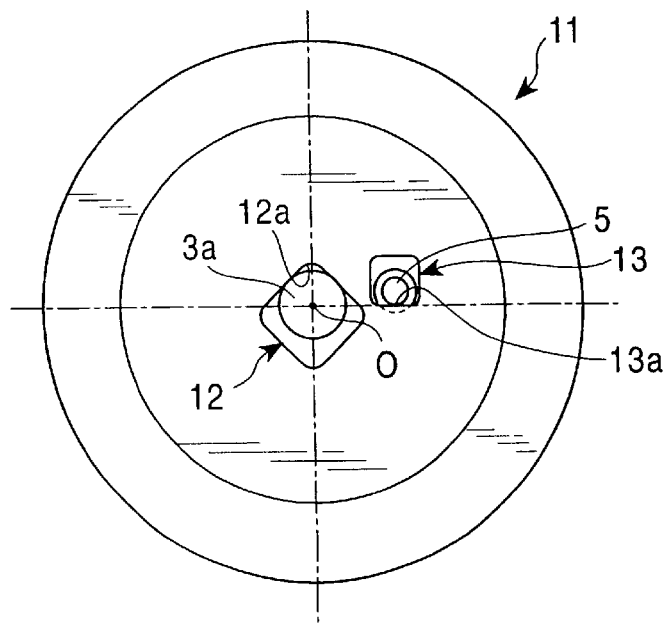
FIG. 2 is a plan view of a hub.

FIG. 1 is a cross-sectional view showing a rotational driving apparatus for a disk according to the present invention; FIG. 2 is a plan view of a hub.

In this rotational driving apparatus, part of a rotor 1 in a rotational driving side forms a turntable 2 that is fixed to the rotor 1. The turntable 2 is fixed to a center axis 3 (spindle). On a base plate 8 in a stationary side, a bearing 9 is disposed in which the center axis 3 is rotatably supported. A annular magnet 7 is fixed to the rotor 1 and on the base plate 8, a driving coil element 10 is fixed opposing the magnet 7. The driving coil element 10 is formed by a yoke 10a made of a magnetic material and a driving coil 10b wound around the yoke 10a. A motor driving unit "M" is formed by the magnet 7 and the driving coil element 10.

On the top surface of the turntable 2, a magnet 4 is disposed as a magnetically attracting member that attracts and fixes the hub 11 to the turntable 2 by magnetic attractive force. A driving pin 5, disposed at one end of a plate spring 6 formed in the turntable 2, is projectable upward from the turntable 2 by the spring force of the plate spring 6. The driving pin 5 may be what is called a "swing-type" fixed to a swingable arm disposed on the turntable 2.

The rotated member is a flexible magnetic disk "D" (floppy disk) with a metallic hub 11 fixed to the center of the disk "D". The disk "D" and the hub 11 are normally accommodated in a hard case, which is omitted in the Figures.

As shown in FIG. 2, the hub 11 is perforated with a center hole 12 and a driving hole 13. When the rotated member is mounted on the rotational driving apparatus for a disk so that the hub 11 is disposed on the turntable 2 and is magnetically attracted, the center hole 12 and the driving hole 13 are inserted by a top end 3a of the center axis 3 and the driving pin 5, respectively. When the turntable 2 is rotated clockwise relative to the hub 11, the driving pin 5 and the top end 3a of the center axis 3 urge an inner edge 13a of the driving hole 13 and an inner edge 12a of the center hole 12 at its corner, respectively. The driving pin 5 and the top end 3a urge the inner edges 13a and 12a, respectively, in the directions opposing each other so that the center of the hub 11 is aligned with the center axis 3 to be positioned for centering on the turntable 2.

As shown in FIG. 2, in the hub 11, the center of the center hole 12 is slightly offset downwardly from the center "O" of the hub 11 when viewed in the Figure, and the driving hole 13 is also formed being offset to the right from the center "O" when viewed in the Figure. Therefore, the hub 11 is imbalanced with respect to the center 0.

Accordingly, in the rotational driving apparatus shown in FIG. 1, even if the rotational members including the rotor 1, the turntable 2, the center axis 3, the driving pin 5, the plate spring 6, and the magnet 7, are adjusted to be balanced by weight, when the hub 11 is mounted on the turntable 2, the entire rotational portion is weight imbalanced due to the weight imbalance of the hub 11.

Figure 5:
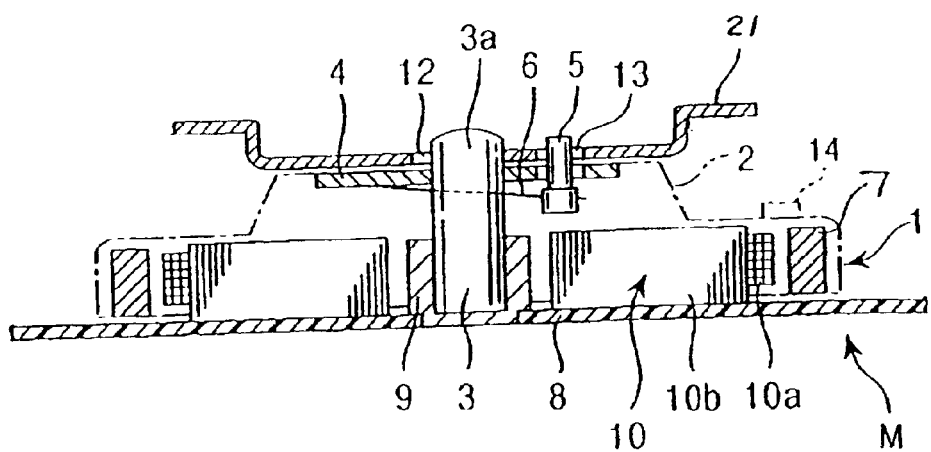
FIG. 5 is a schematic representation showing a method for balance adjustment by weight according to the present invention wherein a dummy member is temporarily mounted on the turntable.

According to the present invention, the state in which the rotational driving apparatus is assembled, including the motor driving unit "M" shown in FIG. 5, the hub 11 without the disk "D" (i.e., a diskless hub) is mounted on the turntable 2 by magnetic attraction. Then, as shown in FIG. 2, the driving pin 5 urges the inner edge 13a of the driving hole 13, while the center axis 3 urges the inner edge 12a of the center hole 12 so that the center of the turntable 2 (the center of the center axis 3) is aligned with the center "O" of the hub 11.

Figure 4:
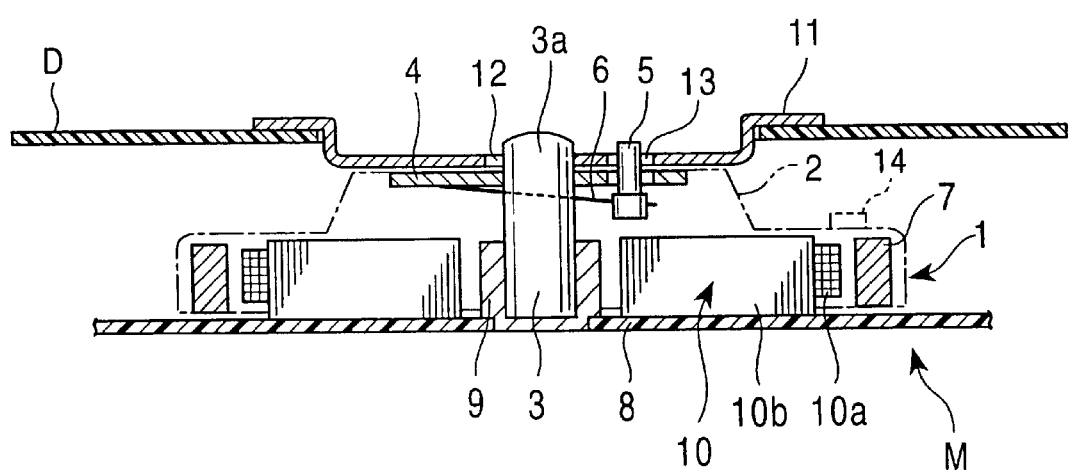
FIG. 4 is a schematic representation showing a method for balance adjustment by weight according to the present invention.

In this state, the rotational members including the rotor 1, the turntable 2, the center axis 3, the driving pin 5, the plate spring 6, the magnet 7, and further including the hub 11 are rotated by supplying driving current to the driving coil 10b. The rotational speed at this time agrees with that of the disk "D" in practical operation. Then, rotational balancing is performed by adding or deleting weight in members other than the hub 11. That is, as shown in FIG. 4, a weight 14 is added to the rotor 1 or part of it is deleted therefrom. Instead of the rotor 1, a weight may be added to the turntable 2 or part of it may be deleted therefrom.

If the rotational driving portion balanced by weight in this manner is assembled on a disk apparatus, when the hub 11 disposed in the center of the disk "D" is actually mounted on the turntable 2 and is rotationally driven, the rotation is well balanced so that any vibration due to imbalance of the weight does not occur.

In addition, not only the hub 11, but also the disk "D" and the hub together, may be mounted on the turntable 2 to adjust the rotational balance, or a dummy member 21 (see FIG. 5) having the same distribution of weight as that of the hub 11 may be mounted on the turntable 2 to adjust the rotational balance.

Figure 3:
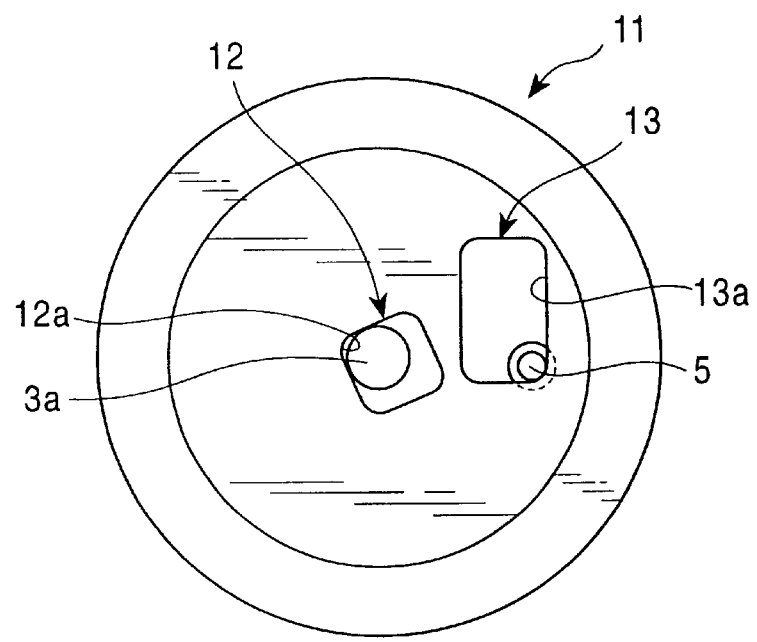
FIG. 3 is a plan view of a hub having another shape.

In the rotational driving apparatus utilizing the hub 11 shown in FIG. 3, after the driving pin 5 supported by the turntable 2 through the plate spring 6 has been inserted into the driving hole 13, the driving pin 5 urges the inner edge 13a of the driving hole 13 by an elastic force of the plate spring 6, and by the reaction force thereof, the inner edge 12a of the center hole 12 of the hub 11 is urged to the top end 3a of the center axis 3, so that centering is achieved.

What is claimed is:

1. A rotational driving apparatus system comprising a user disk and a rotational driving apparatus for rotating the user disk, said rotational driving apparatus being separately supplied by a manufacturer, said user disk being separately supplied by a user and configured to be removably mounted on said rotational driving apparatus by said user, said rotational driving apparatus comprising:

a turntable for magnetically attracting a hub disposed in the center of the user disk, the hub having a center hole and a driving hole formed therein;

a center axis protruding at the rotational center of said turntable and configured to be inserted into the center hole of said hub;

a driving pin supported by said turntable so as to be projectable therefrom and configured to be inserted into the driving hole of said hub;

rotating members including said turntable; and motor driving means for rotationally driving said rotating members;

wherein said rotational driving apparatus system further comprises a diskless dummy hub, said diskless dummy hub being separately supplied by the manufacturer of the rotational driving apparatus; and wherein said rotating members comprise a rotational balance that has been adjusted while said user disk is not mounted on said apparatus, said rotational balance being adjusted by imparting a weight to, or removing a portion of, said rotating members while the diskless dummy hub has been temporarily mounted on said turntable, by inserting the center axis of said turntable into a center hole of said diskless dummy hub, by inserting the driving pin into a driving hole of said diskless dummy hub, and by rotating the diskless dummy hub at a speed of rotation equal to a design speed of rotation of said user disk.

2. The rotational driving apparatus system according to claim 1 wherein the diskless dummy hub and the hub of said user disk have a similar size, shape and weight.

3. A method for manufacturing a rotational driving apparatus for rotating a user disk, said user disk being separately supplied by a user and configured to be removably mounted on said rotational driving apparatus by said user, said apparatus comprising a turntable for magnetically attracting a hub disposed in the center of the user disk, said hub having a center hole and a driving hole, a center axis protruding at the rotational center of the turntable and configured to be inserted into the center hole of the hub, a driving pin supported by the turntable so as to be projectable therefrom and configured to be inserted into the driving hole of the hub, rotating members including said turntable, and motor driving means for rotationally driving said rotating members, said method comprising the steps of:

temporarily fixing a diskless dummy hub to said turntable by inserting the center axis of said turntable into a center hole of the diskless dummy hub and by inserting said driving pin into a driving hole of said diskless dummy hub, said diskless dummy hub being of similar size and shape as that of said hub of said user disk;

adjusting a rotational balance of the rotating members by rotating said diskless dummy hub at a speed of rotation that is equal to a design speed of rotation of said user disk, said adjustment being performed by imparting weight to said rotating members or by deleting a portion of said rotating members; and removing the diskless dummy hub from said turntable after the rotational balance of the rotating members has been adjusted.

4. A rotational driving apparatus system comprising a user disk and a rotational driving apparatus for rotating the user disk, said rotational driving apparatus being separately supplied by a manufacturer, said user disk being separately supplied by a user and configured to be removably mounted on said rotational driving apparatus by said user, said rotational driving apparatus comprising:

a turntable for magnetically attracting a hub disposed in the center of the user disk, the hub having a center hole and a driving hole formed therein;

a center axis protruding at the rotational center of said turntable and configured to be inserted into the center hole of said hub;

a driving pin supported by said turntable so as to be projectable therefrom and configured to be inserted into the driving hole of said hub;

rotating members including said turntable; and motor driving means for rotationally driving said rotating members;

wherein said rotational driving apparatus system further comprises a dummy disk, said dummy disk being separately supplied by the manufacturer of the rotational driving apparatus; and wherein said rotating members comprise a rotational balance that has been adjusted while said user disk is not mounted on said apparatus, said rotational balance being adjusted by imparting a weight to, or removing a portion of, said rotating members while the dummy disk has been temporarily mounted on said turntable by inserting the center axis of said turntable into a center hole of said dummy disk, the driving pin is inserted into a driving hole of said dummy disk, and the dummy disk is rotated at a speed of rotation equal to a design speed of rotation of said user disk.

5. The rotational driving apparatus system according to claim 4 wherein the dummy disk and the user disk have a similar size, shape and weight.

6. A method for manufacturing a rotational driving apparatus for rotating a user disk, said user disk being separately supplied by a user and configured to be removably mounted on said rotational driving apparatus by said user, said apparatus comprising a turntable for magnetically attracting a hub disposed in the center of the user disk, said hub having a center hole and a driving hole, a center axis protruding at the rotational center of the turntable and configured to be inserted into the center hole of the hub, a driving pin supported by the turntable so as to be projectable therefrom and configured to be inserted into the driving hole of the hub, rotating members including said turntable, and motor driving means for rotationally driving said rotating members, said method comprising the steps of:

temporarily fixing a dummy disk to said turntable by inserting the center axis of said turntable into a center hole of the dummy disk and by inserting said driving pin into a driving hole of said dummy disk, said dummy disk being of similar size and shape as that of said user disk; and adjusting a rotational balance of the rotating members by rotating said dummy disk at a speed of rotation that is equal to a design speed of rotation of said user disk, said adjustment being performed by imparting weight to said rotating members or by removing a portion of said rotating members; and removing the dummy disk from said turntable after the rotational balance of the rotating members has been adjusted.

* * * * *